Feb. 16, 1937.  E. E. JENNINGS  2,071,126
BAIL CONNECTION
Filed July 11, 1934
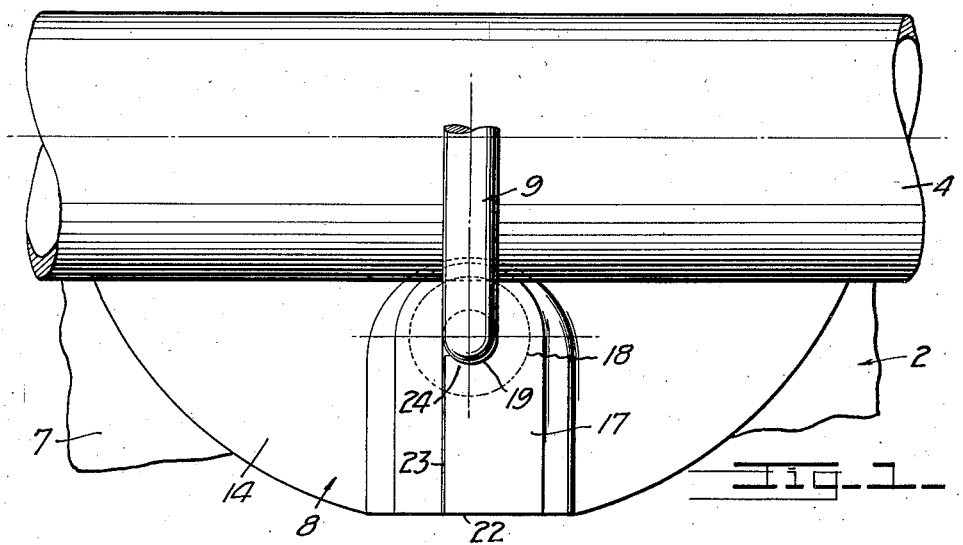
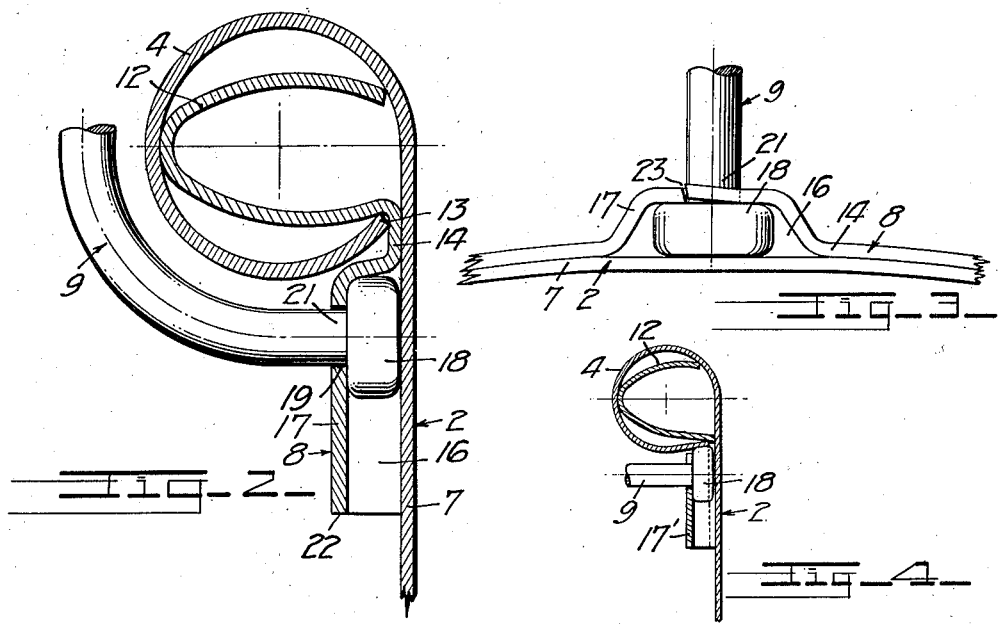
INVENTOR.
ERNEST E. JENNINGS
BY Joseph B. Gardner
ATTORNEY Patented Feb. 16, 1937

2,071,126

UNITED STATES PATENT OFFICE 2,071,126

BAIL CONNECTION

Ernest E. Jennings, Berkeley, Calif., assignor to Rheem Manufacturing Company, Richmond, Calif., a corporation of California Application July 11, 1934, Serial No. 734,631

11 Claims. (Cl. 220—91)

The invention relates to means for connecting a bail wire to the body of a sheet metal pail or other receptacle, and more particularly the invention relates to bail connecting means utilizing an ear member secured to the pail body by interlock with the beaded or rolled edge of the pail rather than by direct attachment to the sides of the pail with solder, rivets or like fastening means.

An object of the invention is to provide a bail connection of the character described in which the ear is so formed that a headed end of the bail may be inserted into or removed from the space between the ear and receptacle body without there being required to be provided, in the face of the ear, permanently open or other disfiguring slots.

Another object of the invention is to provide a bail connection of the character described which permits of the ear being made of relatively small size, reduces the leverage action tending to separate the ear from the receptacle, and provides for increased effectiveness in the attachment of the ear to the receptacle.

A further object of the invention is to provide a bail connection of the character described which insures at all times the smooth and easy movement of the bail relative to the receptacle, and avoids subjecting to excessive wear the portion of the ear defining the opening through which the bail extends into the ear.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a fragmentary side elevation of a receptacle provided with the bail connection of my invention.

Figure 2 is a vertical sectional view of the parts shown in Fig. 1, the plane of the section being indicated by the line 2—2.

Figure 3 is a horizontal sectional view of parts taken on the line 3—3 of Figure 1.

Figure 4 is a view similar to Fig 2, but showing a somewhat modified construction.

As will be clear from the drawing, the receptacle 2 with which the bail connection of my invention is incorporated, is provided with a bead 4 along the rim of the receptacle opening and formed by rolling the edge portion of the receptacle outwardly and downwardly and then inwardly and preferably slightly upwardly so as to make the bead substantially cylindrical in cross-section. Arranged for positioning and retention against the side wall 7 of the receptacle is an ear 8 by which a bail 9 of wire or the like may be pivotally connected to the receptacle. It will of course be understood that a pair of the ears is provided at diametrically opposed points on the receptacle so as to accommodate the two ends of the bail.

Attachment of the ear to the receptacle is afforded by means of a bead 12 provided at the upper edge portion of the ear and formed by bending said portion outwardly but thence upwardly and inwardly—in other words, reversely of the bead 4. The bead 12 is arranged to fit within the bead 4 and is designed to contact therewith at three points. In the present instance one point of contact is adjacent the juncture of the edge 13 and the side of the receptacle, another is above the first point but inwardly of the vertical center of bead 4, while the third point is approximately at the horizontal center of bead 4 but along the outer portion. At the first point of engagement aforesaid the ear is gripped between the edge 13 and the side wall of the receptacle, and in order to insure firm engagement between the beads at the two other points, the portions of the bead 12 between the points arranged for contact with bead 4 are preferably made of such length as to require their being more or less sprung when bead 12 is inserted in position. With the points of engagement between the beads thus well distributed and maintained, and the edge 13 firmly held in the crotch between the bead 12 and body portion 14 of the ear, no opportunity will be afforded for rotation of the bead 12 within bead 4 so as to swing the body portion 14 outwardly. To further prevent such rotation the bead 12, as well as the upper portion of body 14, is made relatively long and designed to conform with the curvature of the engaged surface of the receptacle. It is important to note that the design of the bead 12 is not only particularly effective for the purpose intended, but avoids the difficulty which would be entailed on attempting to fit a cylindrical bead in bead 4.

For the reception of the bail end, a depression 16 is provided in the ear, and as here shown such depression is formed by pressing outwardly in the body 14 of the ear a boss 17. The bail end is provided with a cylindrical head 18 of a thickness permitting it to lie practically entirely within the depression, and the latter is curved at the top in conformity with and arranged to be engaged by the cylindrical edge of the head. In concentric relation with the curvature at the top of the depression is a round opening 19 in which is arranged to engage the correspondingly shaped and sized portion 21 of the bail end designed to extend through the ear. It will thus be apparent that two sets of cooperating bearing surfaces are provided for assuming the thrust between the bail and ear and therefore no danger of undue wear at the opening 19 will be encountered.

It should be noted that the head is formed relatively thin and therefore only a shallow depression is required in the ear, and at the same time the interengaging portions of the edge of the head and the boss are close to the bead. These factors are of considerable importance, since the lever action of the bail tending to separate the ear from the receptacle is reduced to a minimum and concentrated at a point where the resistance to such separation is at a maximum.

It may be explained that the ear is preferably arranged to be secured in position against the side of the receptacle before the bail is connected to the ear, and it is important, under such circumstances, as part of my invention to so form the ear that the headed bail end may, subsequent to said positioning of the ear, be readily inserted into and effectively retained within the depression. As will be clear from Figures 1 and 2, the boss 17 is so formed as to extend the depression 16 for the full width thereof to the lower extremity 22 of the ear. In this way the depression will be open at its bottom side and to a degree permitting of the insertion of the head 18. To permit the bail end portion 21 to be inserted into the hole 19, the boss is formed with a slit 23 which extends from the extremity 22 to the hole 19. The slit 23 is preferably disposed in tangential relation to the side of the hole so that by bending outwardly the portion 24 of the boss under the hole, the bail portion 21 may, while the head is placed in the depression, be readily slipped through the temporary passage thus formed and into the hole. After the bail is in operative position, the boss portion 24 is bent back to bring the edges at the slit together and thereby lock the bail in the ear. While the slit in the boss is primarily adapted for use in inserting the bail in position in the ear, it will be clear that the portion 24 may be bent outwardly to permit the release of the bail when desired.

In the embodiment of the invention illustrated in Figure 4, the top of the boss 17' is left open, thereby permitting the bail head to bear directly against the lower side of the receptacle bead.

I claim:

1. A bail connection for a receptacle having an outwardly rolled edge defining a hollow bead along the rim of the receptacle opening, comprising an ear having a bead of different peripheral shape than said first bead and sprung therein into resilient engagement therewith, and a bail pivotally carried by said ear.

2. A bail connection for a receptacle having an outwardly and downwardly rolled edge defining a hollow bead along the rim of the receptacle opening, comprising an ear having along the upper edge thereof a portion bent substantially reversely of said receptacle bead and resiliently pressed into said first bead so as to contact with the interior thereof exclusively at transversely spaced points therein, and a bail pivotally carried by said ear.

3. A bail connection for a receptacle having an outwardly rolled edge portion defining a hollow bead along the rim of the receptacle opening, comprising an ear interposed between the free edge of said rolled portion and the side of said receptacle and having within said bead a plurality of portions spaced from each other and arranged to resiliently engage the walls of said bead exclusively at transversely spaced points.

4. A bail connection for a receptacle, a metal ear secured to and positioned against a side of said receptacle and having a portion recessed and with an opening extending therethrough to said recess, and a bail end having a portion comprising a head of general circular formation extending through said opening and a portion of which bears against an edge surface of said recess serving aside from said opening for supporting said bail.

5. A bail connection for a receptacle, comprising an ear secured to and positioned against the outer side of said receptacle and provided with an opening therethrough and on the inner side thereof with a recess communicating with said opening and having transverse surface spaced from and curved about the center of said opening, and a bail end having a portion bearing in said opening and a head with a curved surface corresponding to and bearing against the curved surface of said recess.

6. A bail connection for a receptacle having an outstanding bead along the rim of the receptacle opening, comprising an ear secured to said receptacle and positioned against the outer side thereof immediately under said bead, said ear provided with an opening therethrough and having a recess on the inner side of the ear at said opening and provided with an open side, and a bail end having a portion engaging in said opening and a portion extending through said open side of the recess and forming an axis perpendicular to the side walls of the receptacle and rotatably engaging said ear, whereby to permit swinging of said bail about an axis perpendicular to the side of said receptacle.

7. A bail connection for a receptacle having a hollow bead along the rim of the receptacle opening, comprising a metal ear having a bead secured within the receptacle bead and provided with a boss defining a recess at the inner side of the ear having an open bottom side, said boss being provided with an opening therethrough extending to said recess and having a slit extending tangentially from said opening to said open bottom of the recess, the edges of the boss defining said slit being normally in contactual relation for substantially the full length of the slit, and a bail end having a portion engaging in said opening and an enlarged portion engaging in said recess.

8. A bail connection for a receptacle comprising, an ear secured to and positioned against the outer side of said receptacle and provided with a boss defining an open bottomed recess at the inner side of the ear, said boss being provided with an opening therethrough extending to said recess and having a slit extending from said opening to the open bottom of the recess, and a bail having a portion engaging in said opening and an enlarged portion engaging in said recess.

9. A bail connection for a receptacle comprising, an ear secured to and positioned against the outer side of said receptacle and provided with a boss defining an open bottomed recess at the inner side of the ear, said boss being provided with an opening therethrough extending to said recess, a bail having a portion engaging in said opening and an enlarged portion engaging in said recess, said boss being provided with a slit extending from said opening to the bottom of said recess for permitting the entry of said bail to said opening, and said slit opening exclusively to a transverse side of said opening.

10. A bail connection for a receptacle having an outwardly rolled edge defining a hollow bead along the rim of the receptacle opening, comprising an ear having a bead sprung therein into resilient engagement with the inner walls of said first bead, and a bail pivotally carried by said ear.

11. A bail connection for a receptacle having rolled edges defining a hollow bead along the rim of the receptacle opening, an ear having an extension inserted within said bead, said rolled edges of said bead and said ear extension being shaped whereby the walls of said bead support and form the exclusive means for retaining said extension within the bead, and said ear against the side of said receptacle.

ERNEST E. JENNINGS.